United States Patent Office 2,849,867
Patented Sept. 2, 1958

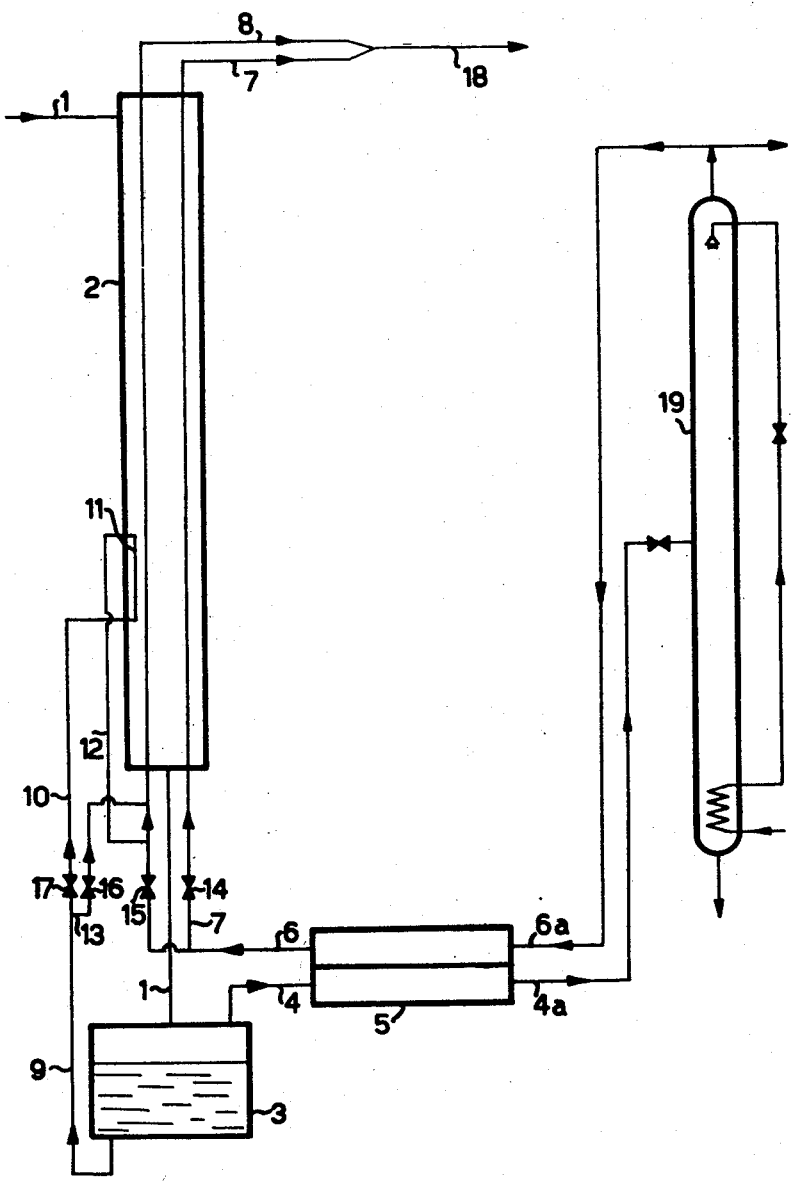

2,849,867

COOLING BY EVAPORATION OF A LIQUID AT A VERY LOW TEMPERATURE

Pieter J. Haringhuizen, Geleen, Netherlands, assignor to Stamicarbon N. V., Heerlen, Netherlands Application February 3, 1956, Serial No. 563,374

Claims priority, application Netherlands February 4, 1955

8 Claims. (Cl. 62—20)

The present invention relates to the generation of cold or cooling by evaporation of a liquid evaporating at a very low temperature.

It is possible to separate under superatmospheric pressure gas mixtures by fractional condensation of the less volatile components. In such process, one or several of the condensate fractions which were separated off is again evaporated, after reduction in pressure, in a system of pipes in countercurrent flow to, but separated from, the gas mixture to be cooled. The heat required for the evaporation is extracted from the gas mixture to be separated, which is thus strongly cooled.

Another method which is sometimes applied involves compressing an auxiliary gas to such a pressure that it becomes liquid on expansion. Subsequently, this liquid, on evaporation in a system of pipes, extracts heat from the gas to be separated or purified, which gas is cooled in this process, so that impurities will condense.

It is an object of the present invention to generate cold in an improved manner.

Another object of the present invention is to generate cold in a low temperature process without evaporation in a vacuum, requiring the use of vacuum pumps.

A further object of the invention is to generate cold in a low temperature process which does not require substantial compression followed by expansion.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

In the process of the present invention, cold is generated by evaporation of a liquid evaporating at very low temperature, e. g., liquid nitrogen, carbon monoxide, argon, methane, in the presence of a more volatile gas, e. g., hydrogen, helium. In general, the liquefiable, less volatile gas used should not exist in the liquid state above about 120° K. The more volatile gas, of course, should be one which is only liquefiable at a lower temperature than the less volatile gas employed.

An example of evaporation of liquified gases accompanied by cooling, to which the present invention is adapted, is found in the synthesis of $NH_3$, employing a synthesis gas mixture containing hydrogen recovered from water gas. Such a synthesis gas always contains argon and methane, which gases do not take part in the $NH_3$ reaction. These gases accumulate in the synthesis apparatus, so that they have to be drained off periodically.

By cooling the gas mixture after the synthesis of $NH_3$, argon and methane fractions can be removed from the residual gases while, by evaporating these less volatile fractions in countercurrent to the gas to be cooled, much cooling can be obtained. The cold hydrogen-nitrogen mixture, which is now free of argon and methane, can then be heated again, likewise in countercurrent to, but separated from, the mixture containing argon and methane, and returning to the $NH_3$-synthesis process.

In the preparation of an $NH_3$ synthesis gas mixture in which the hydrogen is recovered from coke-oven gas, cooling is also obtained by evaporation of the volatile fractions removed by condensation from the coke-oven gas by cooling it at a pressure of about 13 atm. These less volatile fractions consist of ethylene, methane and carbon monoxide. Besides, cold is generated by liquefying nitrogen and evaporating it. The cold hydrogen, which is still subject to the separation pressure of 13 atm., is again heated in countercurrent to the coke-oven gas to be separated. By supplying nitrogen to the hydrogen residue of the coke-oven gas, an $NH_3$ synthesis gas of the correct composition is eventually obtained. With a view to attaining the best possible recovery of cold at a low temperature level, part of the nitrogen to be supplied is sometimes added in the liquid state to the cold hydrogen, after which this nitrogen is evaporated during the heating of the hydrogen in countercurrent flow to coke-oven gas to be cooled. In this case, the liquid nitrogen will evaporate under the gradually rising partial pressure of nitrogen of the gaseous hydrogen-nitrogen mixture which is becoming richer in nitrogen.

Another important application of the recovery of cold by evaporation of a liquefied gas is encountered in the recovery of deuterium from hydrogen, for example, if the hydrogen is contained in an $NH_3$ synthesis gas mixture or a mixture of hydrogen and carbon monoxide (see, e. g., Chemical Eng. Progress, vol. 50, pp. 227, 228 and Fig. 11). First, the mixture is cooled under pressure to the point where the $N_2$ or CO condenses to form a liquid, whereafter cooling is continued, so that the last few traces of $N_2$ or CO solidify and deposit, after which, by rectification of the hydrogen made liquid by expansion, a deuterium containing fraction is recovered, while the deuterium free top product is heated in countercurrent to deuterium containing hydrogen—the gas to be cooled— in which process, the nitrogen or CO first deposited in the cold accumulators is taken up again. The nitrogen or carbon monoxide separated off in the liquid state is evaporated, after expansion, in a separate pipe system, the heat of evaporation being extracted from the gas mixture to be cooled while, finally, the gas obtained in this evaporation is compressed and added to the hydrogen, after which the gas mixture is conducted to the $NH_3$ synthesis (when nitrogen is utilized) or Fischer-Tropsch synthesis process (when CO is utilized).

Theoretically, it would also be preferable in this case, from the point of view of cold economy, to add the nitrogen, as is usual in the preparation of an $NH_3$ synthesis mixture from coke-oven gas, as a liquid to the cold hydrogen returning from the rectification (at the point where this current of hydrogen leaves the cold accumulator mentioned before) and then have this liquid nitrogen evaporate in an atmosphere of hydrogen and nitrogen under the partial nitrogen pressure. The same applies, of course, when CO is substituted for the $N_2$, should a $H_2$—CO mixture be formed and the liquid fraction consists of CO in the Fischer-Tropsch process.

Yet, this procedure has not been applied in the recovery of deuterium from synthesis gas mixtures of either of the two types referred to above for the following reasons: The temperatures involved here are just above the solidifying point of $N_2$ or CO, and as the pressure of the returning hydrogen (about 1.3 atm.) is also considerably lower than it is in the separation of coke-oven gas, the cooling in consequence of the evaporation of liquid nitrogen under very low initial partial pressure would become so strong that the liquid would solidify, causing blockage of the apparatus.

Therefore, it has been found desirable to evaporate the liquid fraction after expansion to about 1 atm. in a separate pipe system, after which the gas formed by this evaporation is added, after having been compressed, to the hydrogen returning from the rectification, which has been heated again. When working in this way, blockage cannot occur as, even at the start of the evaporation, the evaporating temperature lies at a level higher than the solidifying point. However, the cold, which was necessary to reduce the hydrogen flowing towards the rectification unit, this hydrogen needing to be cooled down further from this temperature level to a temperature near the solidifying point of nitrogen, is not recovered in this way.

In order to compensate for the cold losses thus caused, measures are required which involve the application of extra energy, e. g., the expansion of gas in an expansion turbine or the evaporation of a liquid fraction in a separate pipe system in vacuo.

Now, it has been found that it is nevertheless possible to add in a simple manner a large portion of the nitrogen, after initial condensation, in the liquid state to the hydrogen at a very low temperature, a few degrees above the solidifying point of nitrogen, and subsequently heat the mixture while evaporating the liquid nitrogen in countercurrent flow to gas to be cooled, without the nitrogen becoming solid, in which process, the cold is recovered at a very low temperature level without any extra energy being consumed.

According to one aspect of the invention, very cold hydrogen returns from the hydrogen rectification unit where deuterium is removed and takes up nitrogen deposited as a solid in a reversible cold accumulator. The mixture of hydrogen and nitrogen leaving the cold accumulator has a temperature slightly higher than that at which nitrogen solidifies and is not completely saturated with nitrogen. To this mixture of hydrogen and nitrogen, there is added gaseous nitrogen, obtained by evaporation of part of the available liquid nitrogen present in the system, as is more fully set forth in the illustrative example. The resulting mixture is several degrees above the triple point of nitrogen and is saturated or virtually saturated with nitrogen. To this nitrogen-saturated mixture, the remainder of the liquid nitrogen is added. Due to the fact that the mixture is heated in heat-exchangers countercurrent to, but separated from, the gas to be cooled, this residue of liquid nitrogen gradually evaporated under the partial pressure of the nitrogen in the hydrogen-nitrogen mixture.

As the hydrogen has only become saturated with nitrogen vapor at a very low temperature level, any cooling down of the mixture beyond the triple point temperature of nitrogen, which might occur on evaporation of liquid nitrogen, is avoided.

The mixture cannot cool down any further, as it is already saturated at the temperature employed and evaporation only takes place if the temperature rises.

If the amount of hydrogen returning from the hydrogen rectification unit is greater than twice the amount of liquefiable nitrogen available, which will nearly always be the case in practice, the larger part of the nitrogen will first have to be evaporated separately, in order that the hydrogen may become saturated, after which only a very small quantity of liquid nitrogen is left to be added in the liquid form. In order to attain the desired cold economy, this is disadvantageous. In such a case, it is nevertheless possible, working according to the invention, to obtain sufficient frigories at a very low temperature level by dividing the current of cold hydrogen in such a way that a large part is heated, without any significant addition of nitrogen, in the heat exchangers in countercurrent flow to newly arriving gas to be cooled while, to the remainder of the hydrogen, first gaseous nitrogen is added again, until the mixture becomes saturated or virtually saturated with nitrogen vapor at several degrees above the triple point, after which the remainder of the nitrogen is added in the liquid state.

Separation of the hydrogen into two portions is normally resorted to if the amount of hydrogen by volume is at least 2 times the amount of liquefiable nitrogen available. In such case, the portion of the hydrogen which is mixed with the nitrogen is so adjusted that 35% to 80% by volume of the final mixture of hydrogen and nitrogen in gaseous form is nitrogen.

It will be clear that the invention is useful not only in the process of recovering deuterium from a mixture of hydrogen and nitrogen in re-uniting liquid nitrogen with gaseous hydrogen freed of deuterium, at a temperature level of only several degrees above the triple point of nitrogen, e. g., 1° K. to 4° K. above the triple point, but can, in principle, also be used advantageously whenever a less volatile gas, present in the liquid state, is to be mixed with a more volatile gas at temperatures lying only several degrees, e. g., about 1° K. to 4° K., above the triple point of the less volatile gas.

The process according to the invention will be explained with the help of the following example and the drawing which is diagrammatic in character.

*Example*

In order to recover deuterium from an $H_2/N_2$ mixture (vol. ratio 4:1), obtained by separation of hydrogen from coke-oven gas and washing with liquid nitrogen by rectification of the hydrogen, the mixture of hydrogen and nitrogen is led through conduit 1 under a pressure of 10 atm. and at the rate of 12,500 m.³ per hour, to a heat exchanger 2, where it is cooled in countercurrent flow to hydrogen returning from the rectification. In this process, the temperature eventually falls to 66.5° K. and a large portion of the nitrogen, namely, 2100 m.³, condenses. The liquid nitrogen is collected in a tank 3. From this tank, the hydrogen, in which now only little nitrogen (3.19% by volume) remains, flows through conduit 4 to one half of the pair of cold accumulators 5, where the remainder of the nitrogen precipitates as a solid. Subsequently, the hydrogen is led to a fractionating column 19 via conduit 4a.

The deuterium is separated from the hydrogen in the fractionating column 19 and the deuterium-free top product at a temperature of 25° K. returns through conduit 6a, under pressure of 1.3 atm., and thence through the other space in the pair of cold accumulators 5. Its temperature rises slowly during the latter step and in doing so, it takes up again the nitrogen which had previously precipitated in the accumulators as a solid and leaves, laden with 3.19% by volume of $N_2$ and at a temperature of 62.5° K., the cold accumulator 5.

Thereafter, the current of hydrogen is divided; 9/10 of it flows through conduit 7 and valve 14 and, thus, through heat exchanger 2, where the cold is gradually given off to the gas mixture arriving through conduit 1.

The remaining 1/10 portion, namely 1000 m.³ $H_2$+33 m.³ $N_2$, flows through conduit 8 and via valve 15 and on through heat exchanger 2. Into this conduit 8 gaseous nitrogen (temperature 80° K., pressure 1.3 atm.) is supplied through conduit 9, valve 17 and conduits 10, 11 and 12. Thus, a mixture is formed which, besides 1000 m.³ $H_2$, contains 251 m.³ $N_2$, or 20.1% by volume. This mixture then has a temperature of 66.4° K. and a dew point of 64.7° K.

Subsequently, the remaining liquid nitrogen is admitted into conduit 8 through conduit 13 and a valve 16. This liquid nitrogen will never cause a temperature drop to below 65° K. so that solidification of $N_2$ (triple point 63.2° K.) and hence blockage of the conduit is impossible. A large portion of the liquid nitrogen evaporates in the bottom part of the heat exchanger at very low temperature, as a result whereof the required frigories are recovered in the temperature range between 67° to 80° K.

in an advantageous way, without either evaporation in a vacuum created by vacuum pumps or by compression followed by expansion.

I claim:

1. In a process for obtaining cooling at a very low temperature in a system by addition of a less volatile liquefied gas to a more volatile non-liquefied gas at about the same temperature, in which process the liquefied gas gradually evaporates while the mixture is heated by heat exchange with a gas to be cooled, the improvement comprising first converting a part of the liquefied gas into vapor in a separate zone and adding said vapor to said more volatile non-liquefied gas to obtain a gas mixture which is substantially saturated with the less volatile gas and which mixture has a temperature only a few degrees higher than the triple point temperature of the less volatile gas and then subsequently adding the remainder of the liquefied gas to said gas mixture.

2. A process according to claim 1, wherein the amount of the less volatile gas introduced into the system is smaller than the amount of more volatile gas introduced into the system and wherein the more volatile gas is divided into two portions, the first of which is not substantially greater than twice the amount of liquefiable gas present and this first portion is the volatile gas to which the vapor of the liquefied gas is added to form the gas mixture saturated with the less volatile gas and the second portion of which is also heated by heat exchange.

3. A process according to claim 2, wherein the two portions of the less volatile gas are united after being subjected to the heat exchange.

4. A process according to claim 2, wherein the more volatile gas is hydrogen and the less volatile gas is nitrogen.

5. A process according to claim 1, wherein the more volatile gas is hydrogen and the less volatile gas is nitrogen.

6. A process according to claim 1, wherein the less volatile gas is selected from the group consisting of nitrogen, carbon monoxide, argon and methane.

7. A process according to claim 6, wherein the more volatile gas is hydrogen.

8. A process according to claim 7, wherein the hydrogen contains deuterium and the deuterium present in the hydrogen is separated therefrom before the hydrogen is saturated with the less volatile gas.

References Cited in the file of this patent

UNITED STATES PATENTS

| | | |
|---|---|---|
| 1,620,192 | Claude | Mar. 8, 1927 |
| 1,702,683 | Claude | Feb. 19, 1929 |
| 1,840,833 | Claude | Jan. 12, 1932 |
| 2,545,194 | Colburn | Mar. 13, 1951 |
| 2,585,288 | Van Nuys | Feb. 12, 1952 |
| 2,760,352 | Hachmuth | Aug. 28, 1956 |